(12) United States Patent
Chen

(10) Patent No.: US 10,852,561 B2
(45) Date of Patent: Dec. 1, 2020

(54) DISPLAY DEVICE AND METHOD

(71) Applicant: GOERTEK TECHNOLOGY CO., LTD., Qingdao (CN)

(72) Inventor: Xiang Chen, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/097,798

(22) PCT Filed: Dec. 21, 2017

(86) PCT No.: PCT/CN2017/117708
§ 371 (c)(1),
(2) Date: Oct. 30, 2018

(87) PCT Pub. No.: WO2019/061884
PCT Pub. Date: Apr. 4, 2019

(65) Prior Publication Data
US 2019/0285903 A1    Sep. 19, 2019

(30) Foreign Application Priority Data
Sep. 26, 2017    (CN) .......................... 2017 1 0882455

(51) Int. Cl.
*G09G 5/377*    (2006.01)
*G09G 5/00*    (2006.01)
(Continued)

(52) U.S. Cl.
CPC ............. *G02B 30/52* (2020.01); *G02B 27/10* (2013.01); *G02B 27/1006* (2013.01);
(Continued)

(58) Field of Classification Search
CPC ... G09G 5/003; G09G 2300/023; G09G 5/377
See application file for complete search history.

(56) References Cited

U.S. PATENT DOCUMENTS 4,190,856 A * 2/1980 Ricks ................. G02B 27/2292
348/42
5,589,980 A   12/1996 Bass et al.
(Continued)

FOREIGN PATENT DOCUMENTS

CN    1621890 A    6/2005
CN    201134086 Y    10/2008
(Continued)

OTHER PUBLICATIONS

JP Notification of Reason for Refusal dated Dec. 10, 2019 as received in Application No. 2018-557084.
(Continued)

*Primary Examiner* — Md Saiful A Siddiqui
(74) *Attorney, Agent, or Firm* — Maschoff Brennan

(57) ABSTRACT

Provided are a display device and method. The device includes: a processor, a display screen component, and a half-transmitting and half-reflecting mirror. The display screen component includes a close-range display screen and a long-range display screen. A distance from the close-range display screen to the half-transmitting and half-reflecting mirror is shorter than a distance from the long-range display screen to the half-transmitting and half-reflecting mirror. The processor is used for sending a close-range image among an image to the close-range display screen for display and sending a long-range image among the image to the long-range display screen for display. The half-transmitting and half-reflecting mirror is used for reflecting and transmitting light emitted from the close-range display screen and light emitted from the long-range display screen. By implementing the embodiment of the scheme, the realistic effect of an image may be enhanced.

20 Claims, 4 Drawing Sheets

(51) Int. Cl.
*G02B 27/22* (2018.01)
*G02B 27/10* (2006.01)
*G02B 27/14* (2006.01)
*G02B 30/52* (2020.01)
*H04N 13/00* (2018.01)
*G02B 30/00* (2020.01)

(52) U.S. Cl.
CPC ........... *G02B 27/144* (2013.01); *G02B 30/00* (2020.01); *G09G 5/003* (2013.01); *G09G 5/377* (2013.01); *H04N 13/00* (2013.01); *G09G 2300/023* (2013.01)

(56) References Cited

U.S. PATENT DOCUMENTS

| | | | | |
|---|---|---|---|---|
| 6,054,969 | A * | 4/2000 | Haisma | G02B 27/2221 345/7 |
| 6,525,699 | B1 * | 2/2003 | Suyama | G02B 27/2278 345/6 |
| 10,139,721 | B1 * | 11/2018 | Choi | G03B 35/22 |
| 2003/0067423 | A1 | 4/2003 | Suyama et al. | |
| 2004/0226868 | A1 | 11/2004 | Shoji et al. | |
| 2011/0063533 | A1 * | 3/2011 | Kim | G09G 3/3611 349/15 |
| 2012/0287125 | A1 * | 11/2012 | Liu | G02B 27/2221 345/419 |
| 2014/0002447 | A1 * | 1/2014 | Shin | G02F 1/1313 345/419 |
| 2014/0003447 | A1 | 1/2014 | Deb et al. | |
| 2015/0152284 | A1 | 6/2015 | Gignoux et al. | |
| 2015/0195502 | A1 * | 7/2015 | Sumi | H04N 13/31 348/43 |
| 2018/0005563 | A1 * | 1/2018 | Lee | G09G 3/2092 |
| 2019/0037196 | A1 * | 1/2019 | Kim | H04N 13/395 |

FOREIGN PATENT DOCUMENTS

| | | |
|---|---|---|
| CN | 101750747 A | 6/2010 |
| CN | 201637936 U | 11/2010 |
| CN | 101980068 A | 2/2011 |
| CN | 203433199 Y | 2/2014 |
| CN | 205880368 U | 1/2017 |
| CN | 106483664 A | 3/2017 |
| JP | S54-500070 A | 11/1979 |
| JP | H08-501397 A | 2/1996 |
| JP | H09-331552 A | 12/1997 |
| JP | H10-500276 A | 1/1998 |
| JP | 2002-244074 A | 8/2002 |
| JP | 2004-290812 A | 10/2004 |
| JP | 2010-160362 A | 7/2010 |
| JP | 2011-034086 A | 2/2011 |
| JP | 5450070 B2 | 3/2014 |
| KR | 10-2008-0103407 A | 11/2008 |

OTHER PUBLICATIONS

CN Office Action dated Dec. 26, 2019 as received in Application No. 201710882455.4.

KR Notification of Reason for Refusal dated Oct. 11, 2019 as received in Application No. 10-2018-7031454.

KR Office Action in Application No. 10-2018-7031454 dated Apr. 27, 2020.

KR Office Action in Application No. 10-2018-7031454 dated Jun. 29, 2020.

CN Office Action in Application No. 201710882455.4 dated May 9, 2020.

CN Office Action in Application No. 201710882455.4 dated Sep. 25, 2020.

JP Office Action in Application No. 2018-557084 dated Jul. 8, 2020.

* cited by examiner

DISPLAY DEVICE AND METHOD

CROSS-REFERENCE TO RELATED APPLICATIONS

This application is a national stage of International Application No. PCT/CN2017/117708, filed on Dec. 21, 2017, which claims priority to Chinese Patent Application No. 201710882455.4, filed on Sep. 26, 2017. Both of the aforementioned applications are hereby incorporated by reference in their entireties.

TECHNICAL FIELD

The present application relates to the technical field of virtual reality, and in particular to a display device and method.

BACKGROUND

Virtual reality technology has been applied to many fields, such as game field, medical field and military field. With a head-mounted virtual reality display device, users can get an immersive viewing experience.

SUMMARY

In the first aspect, the present application provides a display device, including: a processor, a display screen component, and a half-transmitting and half-reflecting mirror.

The display screen component includes a close-range display screen and a long-range display screen. A distance from the close-range display screen to the half-transmitting and half-reflecting mirror is shorter than a distance from the long-range display screen to the half-transmitting and half-reflecting mirror.

The processor is used for sending a close-range image among an image to the close-range display screen for display and sending a long-range image among the image to the long-range display screen for display.

The half-transmitting and half-reflecting mirror is used for reflecting and transmitting light emitted from the close-range display screen and light emitted from the long-range display screen.

In the second aspect, the present application provides a display method, applied to a processor. The method includes:

acquiring an image to be displayed in a virtual scene;

dividing the image into a close-range image and a long-range image according to a distance from a location of a user in the virtual scene to a scenery in the image to be displayed; and sending the close-range image to a close-range display screen for display, and sending the long-range image to a long-range display screen for display, where a distance from the close-range display screen to eyes of the user is shorter than a distance from the long-range display screen to the eyes of the user.

BRIEF DESCRIPTION OF THE DRAWINGS

The drawings illustrated herein are intended to provide a further understanding of the present application, which constitutes a part of the present application, where schematic embodiments of the present application and illustrations thereof serve to explain the present application, and do not constitute improper limitation to the present application. In drawings.

Figure 1:
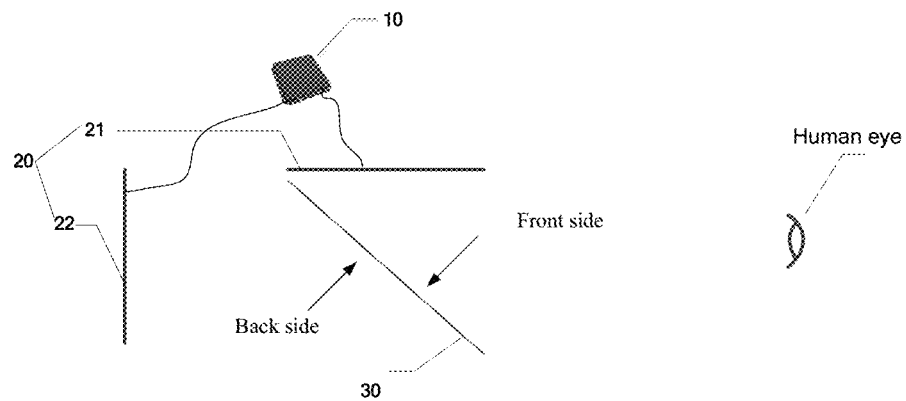
FIG. 1(a) is a structural schematic diagram of a display device provided by an embodiment of the present application.
FIG. 1(b) is another structural schematic diagram of a display device provided by an embodiment of the present application.
Figure 1:
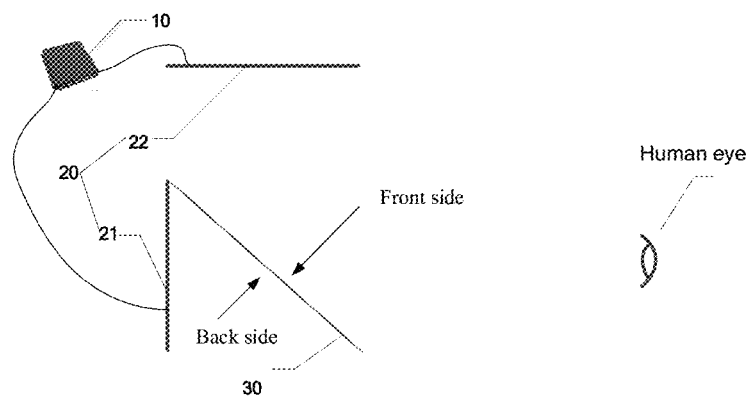

A corresponding relationship between reference signs and component names in the foregoing drawings is as follows:

10—processor; 20—display screen component; 21—close-range display screen; 22—long-range display screen; 30—half-transmitting and half-reflecting mirror; 40—first lens.

DESCRIPTION OF EMBODIMENTS

For the purpose of making objectives, technical schemes and advantages of the present application more clear, clear and complete description will be made to the technical schemes of the present application in conjunction with specific embodiments and corresponding drawings. Obviously, the described embodiments are merely a part of the embodiments of the present application and not all the embodiments. Based on the embodiments of the present application, all other embodiments obtained by those ordinarily skilled in the art without paying creative work fall within the protection scope of the present application.

The present application provides a display device, used for enhancing the realistic effect of an image.

It should be noted that the display device provided by the present application may be a display device of head-mounted glasses, a display device of a three-dimensional movie, or the like.

As shown in FIG. 1(a), a display device provided by the present application includes: a processor 10, a display screen component 20, and a half-transmitting and half-reflecting mirror 30.

The display screen component 20 includes a close-range display screen 21 and a long-range display screen 22, where a distance from the close-range display screen 21 to the half-transmitting and half-reflecting mirror 30 is shorter than a distance from the long-range display screen 22 to the half-transmitting and half-reflecting mirror 30. It should be noted that the distance, mentioned in the present embodiment, from the close-range display screen 21 to the half-transmitting and half-reflecting mirror 30 refers to the distance from a center point of the close-range display screen 21 to a center point of the half-transmitting and half-reflecting mirror 30; and the distance, mentioned in the present embodiment, from the long-range display screen 22 to the half-transmitting and half-reflecting mirror 30 refers to the distance from a center point of the long-range display screen 22 to the center point of the half-transmitting and half-reflecting mirror 30.

The processor 10 is used for sending a close-range image among an image to the close-range display screen 21 for display and sending a long-range image among the image to the long-range display screen 22 for display.

The half-transmitting and half-reflecting mirror 30 is used for reflecting and transmitting light emitted from the close-range display screen 21 and light emitted from the long-range display screen 22.

Figure 2:
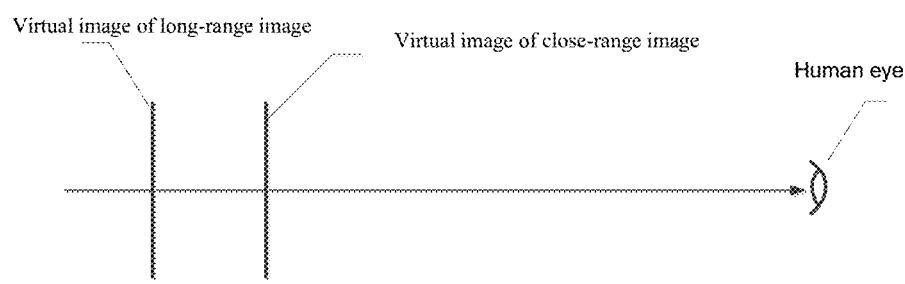
FIG. 2 is a positional schematic diagram of a virtual image of a long-range image and a virtual image of a close-range image of a display device provided by an embodiment of the present application.

In practical application, after the processor helps the close-range image to be displayed on the close-range display screen 21 and the long-range image to be displayed on the long-range display screen 22, the half-transmitting and half-reflecting mirror 30 reflects and transmits light emitted from the close-range display screen 21 and light emitted from the long-range display screen 22, so that a virtual image of the close-range image displayed by the close-range display screen 21 and a virtual image of the long-range image displayed by the long-range display screen 22 can be viewed by human eye, as shown in FIG. 2. Since the distance from the close-range display screen 21 to the half-transmitting and half-reflecting mirror 30 is shorter than the distance from the long-range display screen 22 to the half-transmitting and half-reflecting mirror 30, the virtual image of the close-range image and the virtual image of the long-range image, which are viewed by the human eye at the same moment, are closer to the human eye and farther away from the human eye respectively. Therefore, the function of displaying the long-range image and the close-range image at different positions away from the human eye is achieved. Based on this, when human eye views a close-range image, that is, when human eye views a virtual image of the close-range image, a virtual image of the long-range image is blurred by the human eye; and when human eye views a long-range image, that is, when human eye views a virtual image of the long-range image, a virtual image of the close-range image is blurred by the human eye. Thus, the realistic effect of an image is enhanced.

Figure 6:
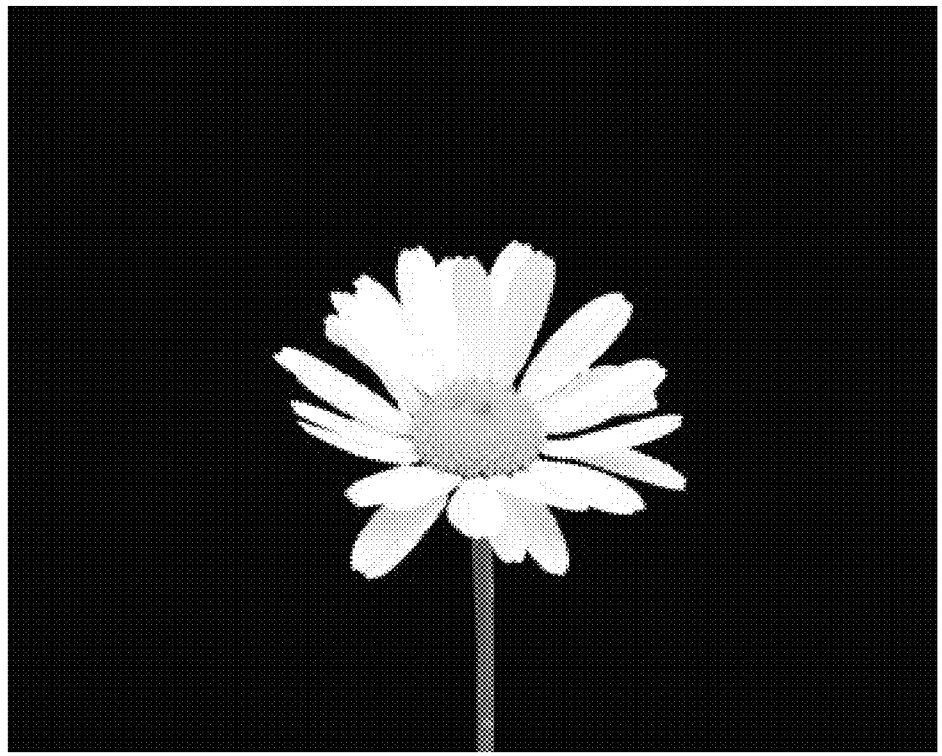
FIG. 6(a) is a virtual image of a close-range display screen in an embodiment of the present application.
FIG. 6(b) is a virtual image of a long-range display screen in an embodiment of the present application.
Figure 6:
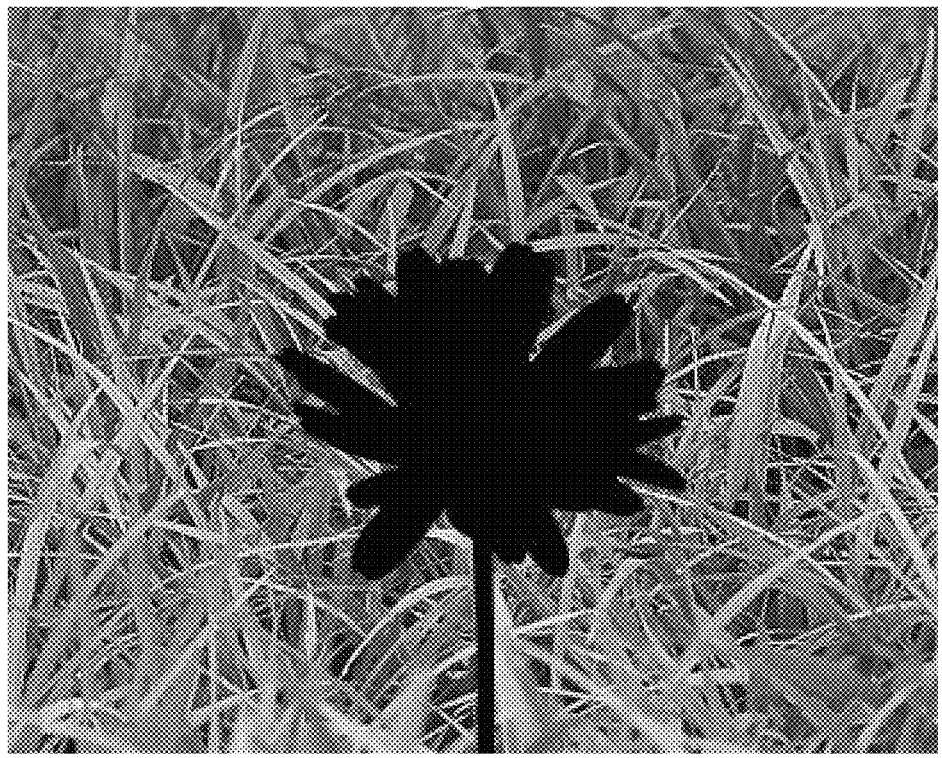

It should be noted that the present application does not define parameters such as the size and resolution of each screen in the display screen component 20. The resolutions of the close-range display screen 21 and the long-range display screen 22 in the display screen component 20 may be identical or different. Preferably, a size of the close-range display screen 21 is much smaller than that of the long-range display screen 22, so that after being transmitted and reflected by a light path, the virtual images of the display screens have matched imaging sizes in the human eye, as shown in FIG. 6(a) and FIG. 6(b). Thus, the displayed long-range image and close-range image have the same size in the human eye.

Optionally, the processor 10 may be any type of processor with an image extraction function, which is not specifically limited in the present application.

Figure 3:
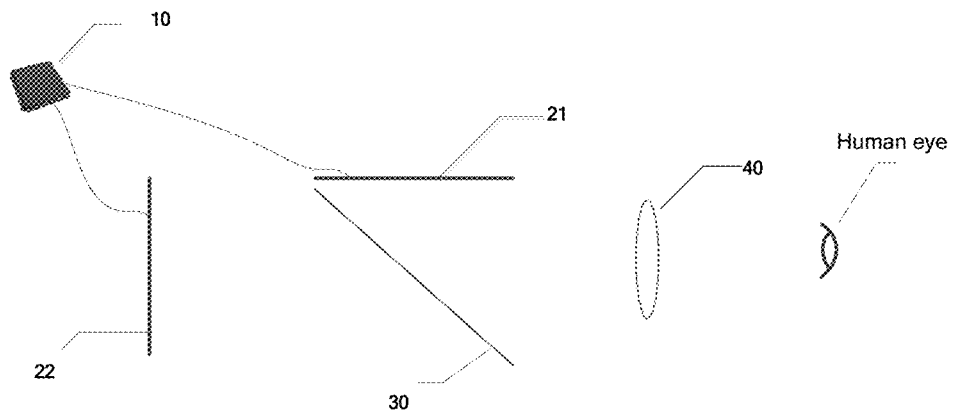
FIG. 3 is yet another structural schematic diagram of a display device provided by an embodiment of the present application.

Optionally, as shown in FIG. 3, the display device provided by the present application further includes a first lens 40. The first lens 40 is arranged between the half-transmitting and half-reflecting mirror 30 and human eye, where the first lens 40 may be a convex lens. Of course, the first lens 40 may be a separate convex lens, or a lens assembly consisting of a plurality of lenses and having the same function as the convex lens.

Optionally, it is unnecessary to add lenses between the close-range display screen 21 and the half-transmitting and half-reflecting mirror 30 and between the long-range display screen 22 and the half-transmitting and half-reflecting mirror 30, or it is possible to add one or more convex lenses or concave lenses for changing an imaging distance between the close-range display screen 21 and the long-range display screen 22. The lens between the close-range display screen 21 and the half-transmitting and half-reflecting mirror 30 is a second lens, and the lens between the long-range display screen 22 and the half-transmitting and half-reflecting mirror 30 may be a third lens. The foregoing second lens and third lens may be: convex lenses, concave lenses, and lens assembly presenting the effects of convex lenses/concave lenses. In particular, when a convex lens (or a lens assembly presenting the effect of a convex lens) is added between the close-range display screen 21 and the half-transmitting and half-reflecting mirror 30, the image of the close-range display screen 21 is closer to the human eye; when a concave lens (or a lens assembly presenting the effect of a concave lens) is added between the close-range display screen 21 and the half-transmitting and half-reflecting mirror 30, the image of the close-range display screen 21 is farther away from the human eye; when a convex lens (or a lens assembly presenting the effect of a convex lens) is added between the long-range display screen 22 and the half-transmitting and half-reflecting mirror 30, the image of the long-range display screen 22 is closer to the human eye; and when a concave lens (or a lens assembly presenting the effect of a concave lens) is added between the long-range display screen 22 and the half-transmitting and half-reflecting mirror 30, the image of the long-range display screen 22 is farther away from the human eye.

In an optional implementation mode, the close-range display screen 21 and the long-range display screen 22 are disposed perpendicularly. It should be noted that the present embodiment only defines a relative position relationship between the close-range display screen 21 and the long-range display screen 22. That is, in the present embodiment, the close-range display screen 21 is perpendicular to the long-range display screen 22. The specific placement state of the close-range display screen 21 and the long-range display screen 22 is not specifically defined in the present embodiment.

On the basis of the foregoing embodiment, optionally, it is reasonable to place the close-range display screen 21 in a horizontal state or a vertical state, or at a certain angle relative to a horizontal/vertical direction. In correspondence to the placement state of the close-range display screen 21, on the premise of being perpendicular to the close-range display screen 21, the long-range display screen 22 may be placed vertically or horizontally, or placed at a certain angle relative to a horizontal/vertical direction.

It will be appreciated that in the present application, the half-transmitting and half-reflecting mirror 30 reflects and transmits light emitted from the close-range display screen 21 and light emitted from the long-range display screen 22 through the half-transmitting and half-reflecting characteristics, so that the virtual image of the close-range image and the virtual image of the long-range image are displayed in one direction, that is, the virtual images of the two images are displayed in an observation direction of the human eye. Therefore, the half-transmitting and half-reflecting mirror 30 is required to be placed at a certain angle with the close-range display screen 21 or the long-range display screen 22. On the basis of ensuring that the virtual image of the long-range image and the virtual image of the close-range image are displayed in the observation direction of the human eye, the present application does not specifically define this angle. Optionally, the half-transmitting and half-reflecting mirror 30 forms an angle of 45° with the close-range display screen 21.

Optionally, for the placement state of the close-range display screen 21, the long-range display screen 22 and the half-transmitting and half-reflecting mirror 30, as shown in FIG. 1(*a*), the close-range display screen 21 is horizontally placed on a front side of the half-transmitting and half-reflecting mirror 30, the long-range display screen 22 is vertically placed on a back side of the half-transmitting and half-reflecting mirror 30, and the half-transmitting and half-reflecting mirror 30 forms an angle of 45° with the close-range display screen 21, so that the half-transmitting and half-reflecting mirror 30 reflects light emitted from the close-range display screen 21 and transmits light emitted from the long-range display screen 22. It should be noted that the front side of the half-transmitting and half-reflecting mirror 30 refers to a side, facing the human eye, of the half-transmitting and half-reflecting mirror 30, and correspondingly, the back side of the half-transmitting and half-reflecting mirror 30 refers to a side, backing on to the human eye, of the half-transmitting and half-reflecting mirror 30.

Optionally, for the placement state of the close-range display screen 21, the long-range display screen 22 and the half-transmitting and half-reflecting mirror 30, as shown in FIG. 1(*b*), the long-range display screen 22 is horizontally placed on a front side of the half-transmitting and half-reflecting mirror 30, the close-range display screen 21 is vertically placed on a back side of the half-transmitting and half-reflecting mirror 30, and the half-transmitting and half-reflecting mirror 30 forms an angle of 45° with the long-range display screen 22, so that the half-transmitting and half-reflecting mirror 30 transmits light emitted from the close-range display screen 21 and reflects light emitted from the long-range display screen 22.

In addition, the present application also provides a display method, applied to a processor. The processor may be a processor of a display device. The display device at least includes a processor, a display screen component, and a half-transmitting and half-reflecting mirror. The display screen component includes a close-range display screen and a long-range display screen. A distance from the close-range display screen to the half-transmitting and half-reflecting mirror is shorter than a distance from the long-range display screen to the half-transmitting and half-reflecting mirror. The half-transmitting and half-reflecting mirror is used for reflecting and transmitting light emitted from the close-range display screen and light emitted from the long-range display screen. The processor is used for implementing the display method provided in the present application.

Figure 4:
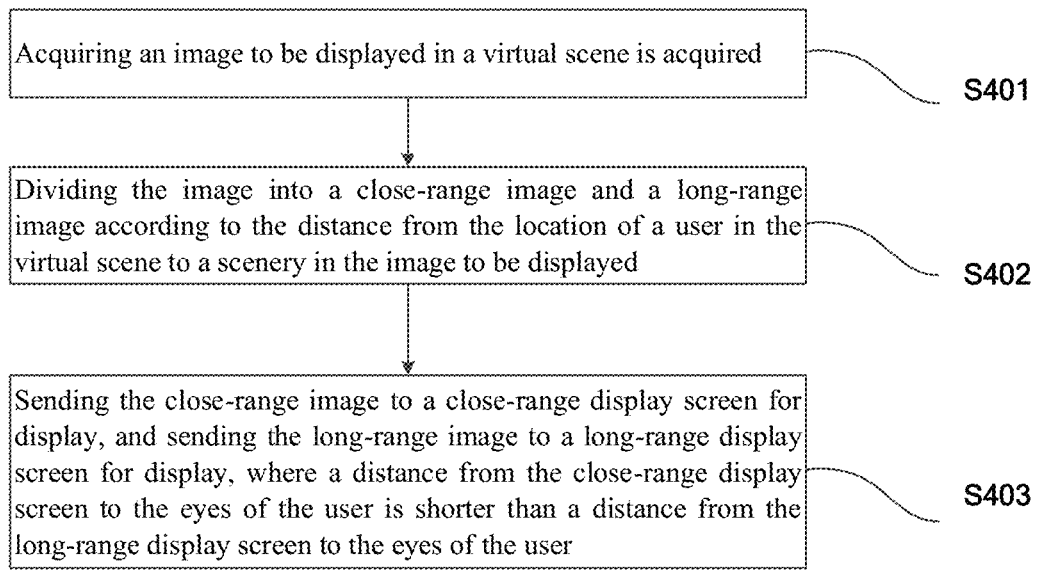
FIG. 4 is a flowchart of a display method provided by an embodiment of the present application.

As shown in FIG. 4, the display method provided by the present application includes the steps as follows.

S401: acquiring an image to be displayed in a virtual scene.

S402: dividing the image into a close-range image and a long-range image according to a distance from a location of a user in the virtual scene to a scenery in the image to be displayed.

S403: sending the close-range image to a close-range display screen for display, and sending the long-range image to a long-range display screen for display, where a distance from the close-range display screen to eyes of the user is shorter than a distance from the long-range display screen to the eyes of the user.

It should be noted that the distance, mentioned in the present embodiment, from the close-range display screen to the eyes of the user refers to the distance from a center point of the close-range display screen to the eyes of the user; and the mentioned distance from the long-range display screen to the eyes of the user refers to the distance from a center point of the long-range display screen to the eyes of the user.

Optionally, in the present application, the close-range image in the close-range display screen may be reflected by a half-transmitting and half-reflecting mirror of the display device, and correspondingly, the long-range image in the long-range display screen may be transmitted by the half-transmitting and half-reflecting mirror of the display device. Or, the close-range image in the close-range display screen may be transmitted by the half-transmitting and half-reflecting mirror of the display device, and correspondingly, the long-range image in the long-range display screen may be reflected by the half-transmitting and half-reflecting mirror of the display device.

The display method provided by the present application is applied to a processor of a display device. The processor respectively displays the close-range image and the long-range image on two display screens which face to different directions, and then the half-transmitting and half-reflecting mirror of the display device enables a virtual image of the close-range image and a virtual image of the long-range image to be displayed toward a user. Since the distance from a close-range display screen of the display device to the half-transmitting and half-reflecting mirror is shorter than the distance from a long-range display screen to the half-transmitting and half-reflecting mirror, the distance from the virtual image of the close-range image corresponding to the close-range display screen to human eye is shorter than the distance from the virtual image of the long-range image corresponding to the long-range display screen to the human eye. Further, when the eyes of the user view the virtual image of the close-range image, the virtual image of the long-range image is blurred by the eyes, and conversely, the virtual image of the close-range image is blurred.

In the present application, the location of a user in a scene and the location of each scenery in a virtual scene in an image are acquired, the distance between the location of the user in the virtual scene and each scenery in an image to be displayed may be calculated according to the foregoing two locations, and the image may be further divided into a close-range image and a long-range image.

Optionally, the specific process of dividing into a close-range image and a long-range image is as follows: extracting a close-range area from the image to be displayed, and filling an area except the close-range area with a preset color, to obtain the close-range image; and extracting a long-range area from the image to be displayed, and filling an area except the long-range area with a preset color, to obtain the long-range image. The close-range area is an area formed by close-range sceneries, and the long-range area is an area formed by long-range sceneries. Preferably, the preset color is black.

Optionally, the close-range sceneries and the long-range sceneries may be determined according to the following steps: if the distance between a certain scenery and the location of the user in the virtual scene is smaller than a preset value, determining the scenery as a close-range scenery, and conversely, determining the scenery as a long-range scenery.

Herein, it should be noted that the close-range area may be a continuous area or may not be a continuous area according to the distribution situation of the close-range sceneries in the image to be displayed. Similarly, the long-range area may be a continuous area or may not be a continuous area according to the distribution situation of the long-range sceneries in the image to be displayed.

Figure 5:
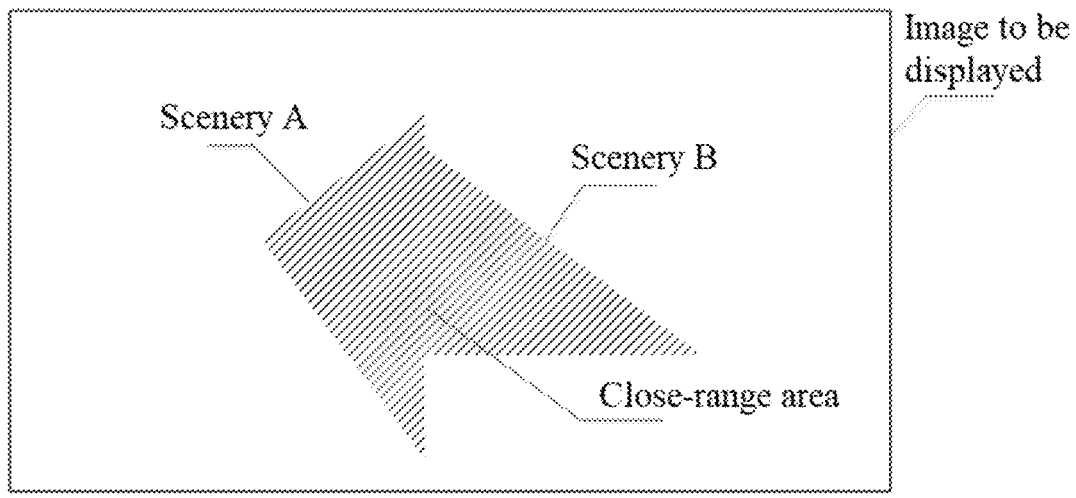
FIG. 5(a) is a shape schematic diagram of a close-range area in a display method provided by an embodiment of the present application.
FIG. 5(b) is another shape schematic diagram of a close-range area in a display method provided by an embodiment of the present application.
Figure 5:
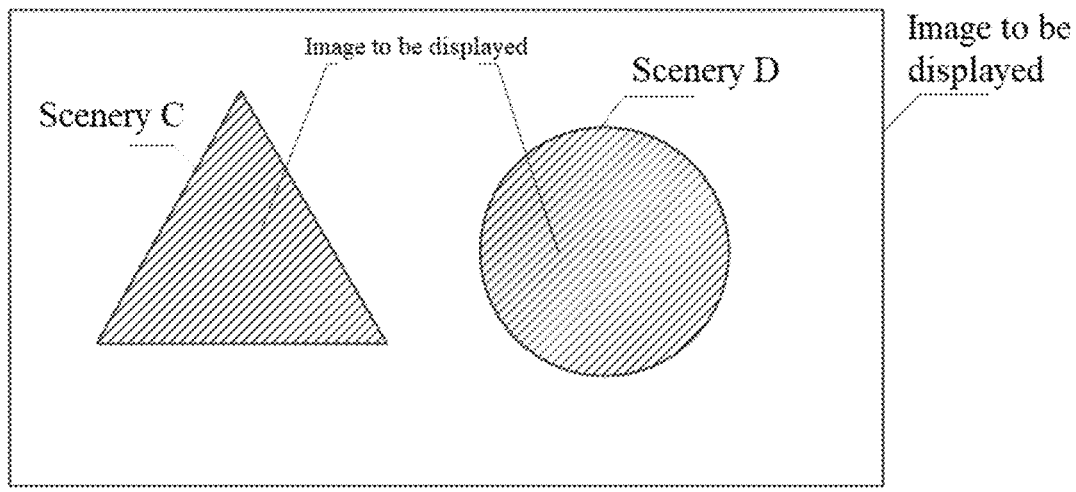

For example, as shown in FIG. 5(a), if adjacent sceneries A and B in an image are determined as close-range sceneries, a continuous area formed by the sceneries A and B in the image is a close-range area; and as shown in FIG. 5(b), if non-adjacent sceneries C and D are determined as close-range sceneries, a non-continuous area formed by the sceneries C and D in the image is a close-range area.

Those skilled in the art should understand that the embodiments of the present application may be provided as a method, a system or a computer program product. Thus, forms of complete hardware embodiments, complete software embodiments or embodiments integrating software and hardware may be adopted in the present application. Moreover, the form of a computer program product implemented on one or more computer available storage media (including, but not limited to, a disk memory, a CD-ROM, an optical memory and the like) containing computer available program codes may be adopted in the present application.

The present application is described with reference to flowcharts and/or block diagrams of the method, the device (system) and the computer program product according to the embodiments of the present application. It should be understood that each flow and/or block in the flowcharts and/or block diagrams and a combination of the flows and/or blocks in the flowcharts and/or block diagrams may be implemented by computer program instructions. These computer program instructions may be provided for a processor of a general-purpose computer, a dedicated computer, an embedded processor or other programmable data processing devices to generate a machine, so that an apparatus for achieving functions designated in one or more flows of the flowcharts and/or one or more blocks of the block diagrams is generated via instructions executed by the processor of the computer or other programmable data processing devices.

These computer program instructions may also be stored in a computer-readable memory capable of guiding the computers or the other programmable data processing devices to work in a specific manner, so that a manufactured product including an instruction apparatus is generated via the instructions stored in the computer-readable memory, and the instruction apparatus achieves the functions designated in one or more flows of the flowcharts and/or one or more blocks of the block diagrams.

These computer program instructions, which can also be loaded onto the computers or the other programmable data processing devices, enable the computers to implement a series of operation steps on the computers or the other programmable devices; therefore, the instructions executed on the computers or the other programmable devices provide a step of achieving the functions designated in one or more flows of the flowcharts and/or one or more blocks of the block diagrams.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may realize information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include transitory computer-readable media such as modulated data signals and carrier waves.

It should also be noted that the terms "including", "containing" or any other variations thereof are intended to encompass a non-exclusive inclusion, such that a process, method, item or device including a series of elements includes not only those elements but also other elements not explicitly listed, or elements that are inherent to such process, method, item or device. In the absence of more restrictions, an element defined by the phrase "including one . . . " does not exclude the existence of additional identical elements in the process, method, item or device that includes the element.

Those skilled in the art should understand that the embodiments of the present application may be provided as a method, a system or a computer program product. Thus, forms of complete hardware embodiments, complete software embodiments or embodiments integrating software and hardware may be adopted in the present application. Moreover, the form of a computer program product implemented on one or more computer available storage media (including, but not limited to, a disk memory, a CD-ROM, an optical memory and the like) containing computer available program codes may be adopted in the present application.

The above is only the embodiments of the present application, and not intended to limit the present application. As will occur to those skilled in the art, the present application is susceptible to various modifications and changes. Any modifications, equivalent replacements, improvements and the like made within the spirit and principle of the present application shall fall within the scope of protection of the present application.

The invention claimed is:

1. A display device, comprising: a processor, a display screen component, and a half-transmitting and half-reflecting mirror, wherein the display screen component comprises a close-range display screen and a long-range display screen, and wherein a distance from the close-range display screen to the half-transmitting and half-reflecting mirror is shorter than a distance from the long-range display screen to the half-transmitting and half-reflecting mirror;

the processor is used for sending a close-range image among an image to the close-range display screen for display and sending a long-range image among the image to the long-range display screen for display; wherein the close-range image is obtained by extracting a close-range area from an image to be displayed, and filling an area in the image to be displayed except the close-range area with a preset color; the long-range image is obtained by extracting a long-range area from the image to be displayed, and filling an area in the image to be displayed except the long-range area with a preset color; and a distance between a scenery in the close-range image and a location of a user in a virtual scene is smaller than a distance between a scenery in the long-range image and the location of the user in the virtual scene; and the half-transmitting and half-reflecting mirror is used for reflecting light emitted from the close-range display screen and transmitting light emitted from the long-range display screen, or transmitting light emitted from the close-range display screen and reflecting light emitted from the long-range display screen, wherein the device further comprises: a second lens, and the second lens is arranged between the close-range display screen and the half-transmitting and half-reflecting mirror; wherein the second lens comprises a convex lens, a concave lens, or a lens assembly presenting the effect of convex lens or concave lens, wherein when the second lens comprises a convex lens or a lens assembly presenting the effect of convex lens, the close-range image of the close-range display screen is closer to the human eye, and wherein when the second lens comprises a concave lens or a lens assembly presenting the effect of concave lens, the close-range image of the close-range display screen is farther away from the human eye.

2. The device according to claim 1, wherein the device further comprises:

a first lens, and the first lens is arranged between the half-transmitting and half-reflecting mirror and human eye.

3. The device according to claim 2, wherein the first lens is a convex lens.

4. The device according to claim 1, wherein the close-range display screen is perpendicular to the long-range display screen.

5. The device according to claim 4, wherein the close-range display screen is horizontally arranged on a front side of the half-transmitting and half-reflecting mirror, the long-range display screen is vertically arranged on a back side of the half-transmitting and half-reflecting mirror, and the half-transmitting and half-reflecting mirror forms an angle of 45° with the close-range display screen.

6. The device according to claim 4, wherein the long-range display screen is horizontally arranged on a front side of the half-transmitting and half-reflecting mirror, the close-range display screen is vertically arranged on a back side of the half-transmitting and half-reflecting mirror, and the half-transmitting and half-reflecting mirror forms an angle of 45° with the long-range display screen.

7. A display method, applied to a processor according to claim 1, wherein the method comprises:

acquiring an image to be displayed in a virtual scene;
dividing the image into a close-range image and a long-range image according to a distance from a location of a user in the virtual scene to a scenery in the image to be displayed; and
sending the close-range image to the close-range display screen for display, and sending the long-range image to the long-range display screen for display.

8. The method according to claim 7, wherein the dividing the image into the close-range image and the long-range image comprises:

extracting a close-range area from the image to be displayed, and filling an area except the close-range area with a preset color, to obtain the close-range image; and
extracting a long-range area from the image to be displayed, and filling an area except the long-range area with a preset color, to obtain the long-range image.

9. The method according to claim 7, wherein a distance from the close-range display screen to eyes of the user is shorter than a distance from the long-range display screen to the eyes of the user.

10. The method according to claim 9, wherein the distance from the close-range display screen to the eyes of the user is a distance from a center point of the close-range display screen to the eyes of the user; and the distance from the long-range display screen to the eyes of the user is a distance from a center point of the long-range display screen to the eyes of the user.

11. The device according to claim 1, wherein a size of the close-range display screen is smaller than a size of the long-range display screen.

12. The device according to claim 1, wherein the scenery in the close-range image is scenery that a distance between the scenery and the user in the virtual scene is smaller than a preset value; and the scenery in the long-range image is scenery that a distance between the scenery and the user in the virtual scene is greater than the preset value.

13. The device according to claim 1, wherein the scenery in the short-range image is continuously distributed in the image to be displayed.

14. The device according to claim 1, wherein the scenery in the long-range image is continuously distributed in the image to be displayed.

15. The device according to claim 1, wherein the scenery in the short-range image is non-continuously distributed in the image to be displayed.

16. The device according to claim 1, wherein the scenery in the long-range image is non-continuously distributed in the image to be displayed.

17. The device according to claim 1, wherein the distance from the close-range display screen to the half-transmitting and half-reflecting mirror is a distance from a center point of the close-range display screen to a center point of the half-transmitting and half-reflecting mirror; and the distance from the long-range display screen to the half-transmitting and half-reflecting mirror is a distance from a center point of the long-range display screen to the center point of the half-transmitting and half-reflecting mirror.

18. A display device, comprising: a processor, a display screen component, and a half-transmitting and half-reflecting mirror, wherein the display screen component comprises a close-range display screen and a long-range display screen, and wherein a distance from the close-range display screen to the half-transmitting and half-reflecting mirror is shorter than a distance from the long-range display screen to the half-transmitting and half-reflecting mirror;
the processor is used for sending a close-range image among an image to the close-range display screen for display and sending a long-range image among the image to the long-range display screen for display; wherein the close-range image is obtained by extracting a close-range area from an image to be displayed, and filling an area in the image to be displayed except the close-range area with a preset color; the long-range image is obtained by extracting a long-range area from the image to be displayed, and filling an area in the image to be displayed except the long-range area with a preset color; and a distance between a scenery in the close-range image and a location of a user in a virtual scene is smaller than a distance between a scenery in the long-range image and the location of the user in the virtual scene; and the half-transmitting and half-reflecting mirror is used for reflecting light emitted from the close-range display screen and transmitting light emitted from the long-range display screen, or transmitting light emitted from the close-range display screen and reflecting light emitted from the long-range display screen, wherein the device further comprises: a third lens, and the third lens is arranged between the long-range display screen and the half-transmitting and half-reflecting mirror;

wherein the third lens comprises a convex lens, a concave lens, or a lens assembly presenting the effect of convex lens or concave lens, wherein when the third lens comprises a convex lens or a lens assembly presenting the effect of convex lens, the long-range image of the long-range display screen is closer to the human eye, and wherein when the third lens comprises a concave lens or a lens assembly presenting the effect of concave lens, the long-range image of the long-range display screen is farther away from the human eye.

19. The device according to claim 18, wherein:
the close-range display screen is perpendicular to the long-range display screen; and
the close-range display screen is horizontally arranged on a front side of the half-transmitting and half-reflecting mirror, the long-range display screen is vertically arranged on a back side of the half-transmitting and half-reflecting mirror, and the half-transmitting and half-reflecting mirror forms an angle of 45° with the close-range display screen.

20. The device according to claim 8, wherein:
the close-range display screen is perpendicular to the long-range display screen; and
the long-range display screen is horizontally arranged on a front side of the half-transmitting and half-reflecting mirror, the close-range display screen is vertically arranged on a back side of the half-transmitting and half-reflecting mirror, and the half-transmitting and half-reflecting mirror forms an angle of 45° with the long-range display screen.

* * * * *